United States Patent
Haffert

(10) Patent No.: US 8,438,821 B2
(45) Date of Patent: May 14, 2013

(54) HARVESTER HAVING AN ADJUSTABLE TRANSFER MEANS

(75) Inventor: Andreas Haffert, Gutersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 12/185,784

(22) Filed: Aug. 4, 2008

(65) Prior Publication Data

US 2009/0113866 A1 May 7, 2009

(30) Foreign Application Priority Data

Aug. 3, 2007 (DE) .................. 10 2007 036 799

(51) Int. Cl.
*A01D 87/10* (2006.01)
*A01D 17/02* (2006.01)

(52) U.S. Cl.
USPC .................................. 56/13.3; 460/114

(58) Field of Classification Search .................. 56/13.3, 56/13.4, 16.6; 460/114, 115, 119
See application file for complete search history.

(56) References Cited

U.S. PATENT DOCUMENTS

| | | | |
|---|---|---|---|
| 708,082 A * | 9/1902 | Sackett | 193/6 |
| 1,336,065 A * | 4/1920 | Bowers | 56/344 |
| 1,618,531 A * | 2/1927 | Hampton | 137/142 |
| 2,253,794 A * | 8/1941 | Lindholm | 56/13.9 |
| 2,634,570 A * | 4/1953 | Brockman et al. | 56/11.9 |
| 3,070,940 A * | 1/1963 | Van Der Lely | 56/13.3 |
| 3,911,650 A * | 10/1975 | Johnson | 56/13.3 |
| 4,821,495 A * | 4/1989 | De Buhr et al. | 56/13.3 |
| 4,996,831 A * | 3/1991 | Pearson et al. | 56/16.6 |
| 5,857,908 A * | 1/1999 | Snyder et al. | 460/115 |
| 5,979,151 A * | 11/1999 | Sanders et al. | 56/60 |
| 6,939,222 B2 | 9/2005 | Grossjohann et al. | |
| 7,036,647 B2 * | 5/2006 | Malmberg | 193/25 C |
| 7,204,752 B2 * | 4/2007 | Archer et al. | 460/114 |
| 7,261,634 B2 * | 8/2007 | Archer et al. | 460/114 |
| 7,325,512 B2 * | 2/2008 | Overstreet | 119/61.2 |
| 2001/0037633 A1 * | 11/2001 | Krone et al. | 56/13.3 |
| 2007/0022725 A1 * | 2/2007 | Voets | 56/13.3 |

FOREIGN PATENT DOCUMENTS

| | | |
|---|---|---|
| DE | 32 24 269 | 3/1983 |
| DE | 102 11 706 | 9/2003 |

* cited by examiner

*Primary Examiner* — Alicia Torres

(74) *Attorney, Agent, or Firm* — Michael J. Striker

(57) ABSTRACT

A harvester (1), and in particular a forage harvester, has an engine and machinery housing (2) and a discharge chute (10) which is mounted to be movable at a discharge opening (9) from the engine and machinery housing (2). The discharge opening (9) is able to be adjusted in height at the engine and machinery housing (2).

15 Claims, 3 Drawing Sheets

HARVESTER HAVING AN ADJUSTABLE TRANSFER MEANS

The present invention claims the benefit of priority to German national application 10 2007 036 799.8 filed in the German Patent Office on Aug. 3, 2007.

The present invention relates to a self-propelled harvester having a transfer means for transferring harvested crop from the harvester to a transporting vehicle situated adjacent the harvester. A transfer means of this kind generally comprises what is referred to as a discharge chute, which is an outlet passage which can be positioned to form a bridge over the side of a transporting vehicle to allow the harvested crop to be emptied into the transporting vehicle's load-carrying space, which is open at the top.

There is already a trend, which has existed for quite some time, for the harvesting process to be speeded up and streamlined by the use of increasingly large harvesters. This entails the need for large transporting vehicles to be able to be used for transporting the harvested crop, in order to minimise the number of journeys to and fro between the fields and the storage site that have to be made to get the harvested crop under cover. The transfer heights to these transporting vehicles may be very large. To be able to load a transporting vehicle of this kind, the harvester has to be capable of raising the harvested crop to the requisite height. If the transporting vehicle is of the maximum permitted height for driving on public roads, then to load the transporting vehicle the harvester needs to have a discharge chute which reaches to a point above this maximum permitted height. A harvester of this kind would not be allowed to use public roads.

Another problem arises in the harvester itself due to the need to ensure that the flow of crop is trouble-free throughout the whole of the harvester. The wider the harvester and the working sub-assemblies used on it, such as front-mounted harvesting attachments, chopping drums or cracker rollers, the more difficult it is for the harvested crop to be channelled down to the cross-section of the discharge chute and fed out through it.

DE 32 24 269 A1 proposes a harvester having a discharge chute which is divided into two sections which are connected together in such a way as to be able to pivot. When the discharge chute is in a working position, the two sections form a continuous conduit and touch one another at the height of the roof of the driver's cab of the harvester. The top section of the discharge chute can be pivoted downwards to reduce the height of the harvester to a size suitable for travel on the road, a break then being made in the conduit. Even in the position where it is pivoted downwards, the discharge chute obstructs the view from the driver's cab.

Known from DE 102 11 706 A1 is a harvester having a discharge chute which can be lengthened in a substantially horizontal direction at its free end by means of a displaceable member. The displaceable member makes it possible for an accompanying vehicle to be loaded evenly with harvested crop even when the harvester is fitted with a front-mounted harvesting attachment, and in particular a maize attachment, which projects out sideways for a long distance and which stops the accompanying vehicle from driving along close beside the harvester. Because the free end of the discharge chute extends substantially horizontally, the extending or retraction of the displaceable member does not cause any appreciable changes in the height of the discharge chute.

It is an object of the present invention to provide a harvester which is capable of loading high-sided accompanying vehicles without its ability to be driven on the road being adversely affected by the discharge chute.

This object is achieved by, in a harvester having an engine and machinery housing and having a discharge chute which is mounted to be movable at a discharge opening from the engine and machinery housing, making the discharge opening able to be adjusted in height at the engine and machinery housing. In this way, when the discharge opening is in a raised position, the harvester can be used to load high-sided accompanying vehicles, whereas when the discharge opening is in a lowered position the height of the harvester, including the discharge chute, can be reduced sufficiently to make the harvester fit for driving on the road.

The discharge opening is preferably the top end of a first section of a duct which has at least two, and preferably precisely two, sections which are displaceable relative to one another telescopically.

The sections of the duct may be of constant cross-section in order to form a continuous conduit for harvested crop which is being discharged both in a raised position and in a lowered position and possibly in intermediate positions too.

However, in an alternative embodiment at least the second section of the duct diverges in the downward direction and the first section of the duct, which has the discharge opening, engages in the second section of the duct. The divergent shape makes it easier for a transition conducive to good flow to be made to a processing chamber of the harvester, such as say to a chopping drum which extends over a considerable proportion of the width of the engine and machinery housing. One consequence of the divergent shape is that in the lower position there is a gap between the sections of the duct. If the first and second sections of the duct are divergent, a top abutting position for the first section of the duct is defined by contact which is made with the second section of the duct, which surrounds it.

The divergent shape of the second section of the duct or of the entire duct makes it possible for a flow of crop of considerable width to be received at an inlet at the bottom end of the duct. In particular, the inlet width at the bottom end of the duct may be more than 700 mm. In this way, the duct may have mounted upstream of it items of processing equipment, such as, say, a front-mounted harvesting attachment, a chopping drum or cracker rollers, of considerable width which can be used for fast and economical harvesting.

The walls of the second section of the duct preferably diverge in the downward direction at an angle of not more than 20°, and preferably of 10° to 18°, to the axis of the duct. When there is a given inlet width at the bottom end of the duct, smaller angles make it necessary for the duct to be of considerable overall height, which is not a help; with larger angles, the problem is that harvested crop is able to collect on the inside surface of the section of duct.

Where the sections of the duct are of constant cross-sections, re-accelerators may be arranged at a bottom section of a lower one of the sections of the duct on both sides of a longitudinal centre plane, to accelerate the harvested crop towards the longitudinal centre plane and upwards and to ensure that the harvested crop is fed efficiently. Re-accelerators may equally well be arranged in a downwardly divergent duct but in this case their job is essentially merely to accelerate the harvested crop in the longitudinal direction of the duct, because the channelling together towards the longitudinal centre plane is achieved essentially by way of the configuration of the duct.

The first section of the duct is preferably able to be displaced obliquely upwards and away from the driver's cab of the harvester. Whereas this means that in the lowered position the discharge opening is situated close to the driver's cab and the discharge chute can be positioned on the engine and machinery housing to project for only a short distance for travel on the road, in the raised position the distance between the discharge chute and the driver's cab, and hence the range of rotation of the discharge chute, is increased.

Also, the discharge chute is usefully rotatable on a vertical axis centred on the discharge opening. Generally speaking, the driver's cab presents less of an obstacle to the rotation of the discharge chute the higher the level at which the discharge opening is situated. Whereas in a conventional harvester the freedom of movement in rotation of the discharge chute hardly exceeds 180°, the invention allows to obtain a freedom of movement in rotation for the discharge chute of 210° or more, and even better of at least 240°, or indeed an unlimited freedom of movement in rotation for it. Generally speaking, the freedom of movement in rotation which can be achieved is all the greater the higher the level at which the discharge opening is situated on the harvester. In most cases, the freedom of movement in rotation is already unlimited even before the discharge opening has been raised above the roof of the driver's cab.

Since the discharge chute can be rotated forward, a vehicle to be loaded does not necessarily have to drive next to the harvester or behind it in the conventional way but can also be a certain distance ahead of the harvester. Because the driver of the harvester then has a good view of the transporting vehicle when driving without having to look round, operation at the time of harvesting is simplified.

From the working position in which it projects above the top face of the engine and machinery housing, the discharge chute can be lowered at least to a position in which it is flush with this top face, to make the harvester fit for travel on the road.

To allow the discharge chute to be secured to the engine and machinery housing for travel and/or to minimise the interference with the driver's view caused by the discharge chute, the latter is preferably able to be pivoted on a horizontal axis situated adjacent the discharge opening from its raised working position to a lowered position for travel.

The invention can be applied to any desired harvesters which transfer harvested crop which has been gathered to an accompanying vehicle with the help of a discharge chute. A preferred area of application for the invention however is forage harvesters, because with them harvested crop is generally fed out continuously through the discharge chute during the harvesting process.

Further features and advantages of the invention can be seen from the following description of embodiments which refers to the accompanying drawings. In the drawings.

Figure 1:
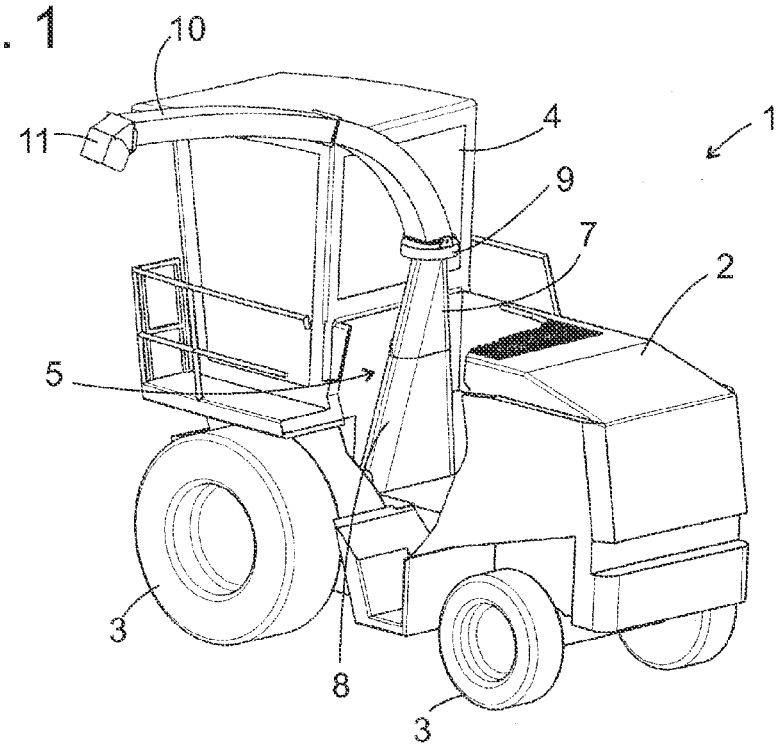
FIG. 1 is a perspective view of a forage harvester according to the invention showing the discharge chute in the working position.

FIG. 1 is a three-quarter perspective view from the rear of a forage harvester 1 according to the invention. An engine and machinery housing 2 of the forage harvester 1 contains an engine to drive the wheels 3 and also sub-assemblies internal to the engine and machinery housing 2 of the harvester such as, say, a chopping drum and/or cracker rollers and a front-mounted attachment (not shown in the Figure) which can be mounted at the front end of the forage harvester 1. Harvested crop which is picked up from the ground with the help of the front-mounted harvesting attachment is comminuted in a chopping drum (which cannot be seen in the Figure) which is arranged inside the engine and machinery housing 2 below the driver's cab 4, grains or kernels, and in particular maize kernels, contained in the harvested crop are comminuted by cracker rollers inserted downstream of the chopping drum, and finally the harvested crop is fed out into a discharge duct 5 which rises behind the driver's cab 4. As can be seen from FIG. 2, there is arranged at the bottom end of the discharge duct 5 a re-accelerator 6. This latter comprises, in a chamber, a rotor having a plurality of rotating blades which on the one hand impel the comminuted harvested crop upwards in the discharge duct 5 as a result of direct contact and which on the other hand form a centrifugal blower, the flow of air from which impels the harvested crop forwards over the entire length of the discharge duct and beyond.

Figure 2:
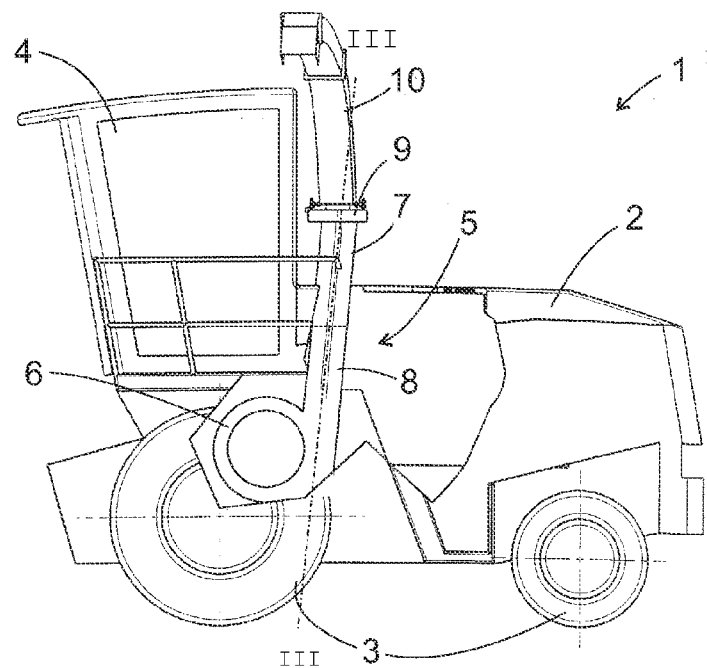
FIG. 2 is a partly cut-away view of the forage harvester from the side.

The discharge duct is composed of two sections 7, 8 which engage in one another telescopically. At a ring mounting 9 which forms the upper termination of the section 7 of the duct, a discharge chute 10 is mounted to be rotatable on the vertical axis of the ring mounting 9. FIGS. 1 and 2 show the discharge chute 10 in an orientation which enables harvested crop to be transferred to a transporting vehicle (not shown) which drives next to the forage harvester 1. An adjustable deflector 11 at the free end of the discharge chute 10 is directed downwards at a steep angle so that the harvested crop is discharged into the transporting vehicle almost vertically downwards. By rotating the discharge chute 10 and adjusting the deflector 11, it is possible to exert accurate control over the distribution of the harvested crop in the transporting vehicle so that its carrying capacity can be fully and satisfactorily exploited.

Figure 3:
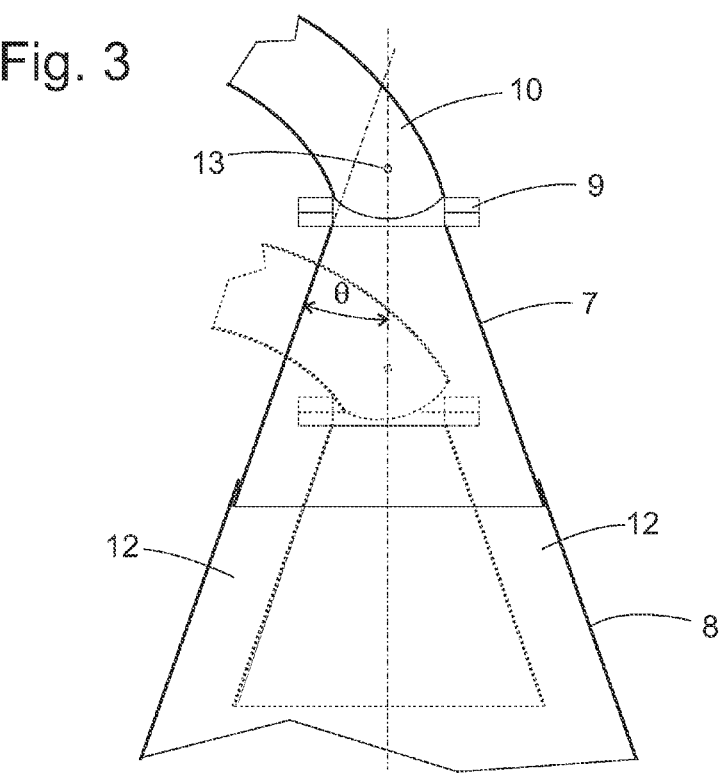
FIG. 3 is a detail view in section on line III-III in FIG. 2.

FIG. 3 is a section through the discharge duct 5 taken on line III-III in FIG. 2. Whereas, as shown in FIG. 2, the dimensions of the discharge duct 5 at right angles to the plane of section defined by line III-III are substantially constant over the entire height of the discharge chute 5, in the plane of FIG. 3 the width of the discharge chute 5 increases continuously in the downward direction starting from the circular ring mounting 9. This configuration for the discharge chute 5 makes it easier for the chopped harvested crop to cross from the chopping drum, which occupies a major proportion of the width of the engine and machinery housing 2, into the discharge chute 5. The width of the chopping drum may be 800 or even 1000 mm or more; any subsequent cracker rollers which there may be are each somewhat narrower than the chopping drum in order to concentrate the flow of harvested crop, and an inlet at the bottom end of the section 8 of the duct is in turn somewhat narrower than the cracker rollers.

In solid lines, FIG. 3 shows the upper section 7 of the duct in a fully raised position. In this position, the bottom edge of the section 7 of the duct rests against the top edge of the lower section 8 of the duct around the entire inner circumference. In this way, the sections 7, 8 of the duct, and the discharge chute 10 which follows on from them, form a continuous conduit for the harvested crop by which this latter, driven by the flow of air from the re-accelerator 6, is guided from the chopping drum into the load-carrying space in the transporting vehicle. The walls of the sections 7, 8 of the duct make an angle θ of 14° with the longitudinal axis of the duct, which latter is indicated by a dotted and dashed line.

From the position which is shown in solid lines in FIG. 3, the upper section 7 of the duct, and with it the discharge chute 10, can be lowered to a position which is shown in broken lines and in which the heights of the two sections 7, 8 of the duct very largely overlap and wide gaps 12 exist between the sections 7, 8 of the duct on both sides of the section 7 of the duct.

It is easy to see that it is not readily possible for harvested crop to be fed out in this lowered configuration. Even if it is assumed that the section 7 of the duct does not jam the re-accelerator 6 when it is in its lowered position shown in broken lines, a flow of air driven by the re-accelerator, and the chopped harvested crop which is carried along in it, would be fed out not only through the section 7 of the duct and the discharge chute 10 connected thereto but also through the gaps 12, and would therefore not reach the transporting vehicle. The lowered position shown in broken lines is therefore suitable, in essence, only for reducing the height of the forage harvester 1 in cases where it is going to be parked or has to travel along public roads.

Figure 4:
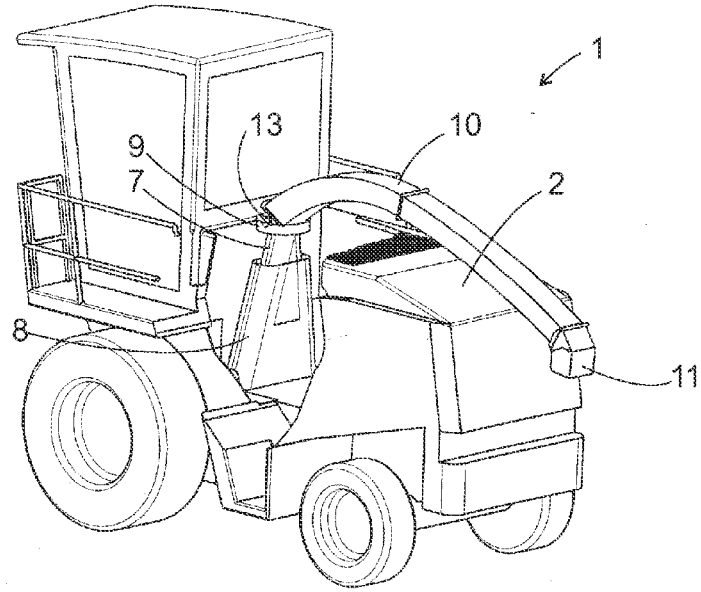
FIG. 4 is a perspective view of the forage harvester showing the discharge chute in the position for travel.
Figure 5:
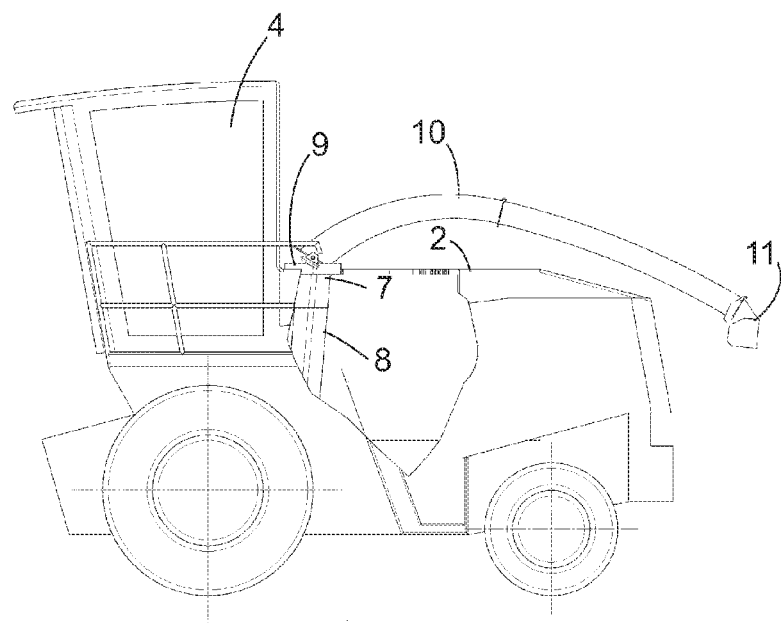
FIG. 5 is a view of the forage harvester from the side showing the discharge chute in the position for travel.

As an additional provision to allow the height of the forage harvester 1 to be reduced for travel on the road, the discharge chute 10 is connected to the ring mounting 9 by a hinge 13 having a horizontal axis. When, as shown in FIGS. 4 and 5, the section 7 of the duct is in the lowered position in which the ring mounting 9 is substantially flush with the surface of the engine and machinery housing 2, the discharge chute 10 can be lowered by an additional amount by pivoting it at the hinge 13, which means that it extends only a short distance above the engine and machinery housing 2.

The discharge duct 5 is oriented to rise not precisely vertically but towards the rear in the longitudinal direction of the vehicle. The result of this is that the ring mounting 9 is spaced away from the rear wall of the driver's cab 4 in the raised position shown in FIGS. 1 and 2. The greater this spacing is, the smaller is the limitation imposed by the driver's cab on the freedom which the discharge chute 10 has to move in rotation on the vertical axis of the ring mounting 9. The sections 7, 8 of the duct may be sufficiently long for the discharge chute 10 to have a freedom of movement in rotation of 360° in a raised position, if the ring mounting 9 is then situated above the roof of the cab 4 or just below it. In the lowered position on the other hand, as can be seen in FIG. 5 in particular, the ring mounting 9 is closed up directly against the rear wall of the driver's cab 4 in order in this way to minimise the amount by which the free end 11 of the discharge chute 10 projects to the rear beyond the engine and machinery housing 2.

Figure 6:
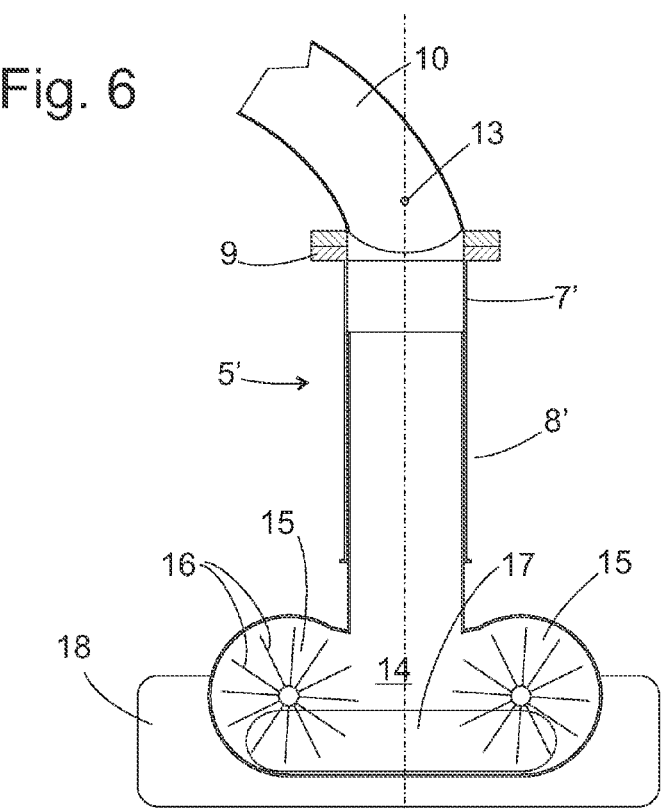
FIG. 6 is a section similar to that shown in FIG. 3 through a second embodiment of the invention.

FIG. 6 is a section similar to that in FIG. 3 through a second embodiment of discharge duct according to the invention for a forage harvester. The discharge duct 5' is once again composed of two sections 7', 8' which engage in one another but, in contrast to the embodiment shown in FIG. 3, in this case the sections 7', 8' of the duct are of cross-sections which remain the same in the longitudinal direction of the discharge duct 5'. Accommodated in a bottom section 14 of the discharge duct 5', which bottom section 14 is substantially wider that the sections 7', 8' of the duct, on the two sides of a longitudinal centre plane of the forage harvester 1 which is shown as a dotted and dashed line, are two re-accelerators 15 having blades 16 which rotate on axes which extend substantially in the longitudinal direction of the forage harvester 1 and at right angles to the plane of section of FIG. 6. Harvested crop makes its way from the chopping drum 18 into the bottom section 14 through an inlet opening 17 on the front side of the latter. Openings which are arranged in the rear side of the bottom section 14 around the axes of rotation of the blades 16 and which cannot be seen in FIG. 6 allow air from outside to enter and this air, accelerated by the blades 16, produces a flow of air through the discharge duct 5' and the discharge chute 10.

To ensure that the harvested crop crosses smoothly from the chopping drum 18 into the bottom section 14, the inlet opening 17 is not substantially narrower than the chopping drum 18 and is substantially wider than the discharge duct 5'. The rotation of the re-accelerators 15 which rotate downstream of the inlet opening 17 causes the harvested crop to be fed towards the centre of the bottom section 14 and from there to be driven into the discharge duct 5'.

Because the sections 7', 8' of the duct are of constant cross-section, the discharge duct 5' always operates in the same way regardless of how far the sections 7', 8' of the duct overlap or are drawn apart from one another. In this way, the transfer height of the forage harvester 1 can be exactly matched to the height of the edge of the transporting vehicle over which it is loaded. The harvested crop does not have to be raised any higher than is absolutely necessary for the purposes of transfer. Consequently, fuel can be saved by running the re-accelerators 15 at an output which is matched to whatever is the transfer height in the given case.

REFERENCE NUMERALS

1 Forage harvester
2 Engine and machinery housing
3 Wheels
4 Driver's cab
5 Discharge duct
6 Re-accelerator
7 Section of duct
8 Section of duct
9 Ring mounting
10 Discharge chute
11 Section
12 Gap
13 Hinge
14 Bottom section
15 Re-accelerator
16 Blades
17 Inlet opening
18 Chopping drum

The invention claimed is:

1. A harvester comprising:
an engine and machinery housing enabling self propelling of the harvester;
a driver's cab;
a duct coupled at one end to the engine and machinery housing to receive harvested material to be discharged from the harvester;
the other end of the duct comprising a discharge opening for discharging harvested material from the duct;
the duct comprising at least two sections which are connected to each other to form a longitudinal extent of the duct along a duct central axis, which at least two sections are each divergent in the downward direction and which are telescopically displaceable relative to one another thereby allowing the discharge opening to be adjusted in height with respect to the driver's cab.

2. The harvester according to claim 1, further comprising a discharge chute coupled at one end to discharge opening to receive material discharged from the duct.

3. The harvester according to claim 2 characterized in that the chute is rotatable about a vertical axis of the discharge opening.

4. The harvester according to claim 3, characterized in that the freedom of movement in rotation of the chute about the vertical axis is at least 240 degrees.

5. The harvester according to claim 2 characterized in that the chute is able to be pivoted from a raised working position to a lowered position for travel on a horizontal axis situated adjacent the discharge opening.

6. The harvester according to claim 2 wherein the discharge chute comprises at least two sections which are displaceable relative to one another telescopically.

7. The harvester according to claim 1, characterized in that re-accelerators are arranged at a bottom section of a lower one of the sections of the duct on both sides of a longitudinal centre plane, to accelerate the harvested crop towards the longitudinal centre plane and upwards.

8. The harvester according to claim 1, characterized in that walls of the at least two sections of the duct diverge in the downward direction at an angle (θ) of not more than 20 degrees to the duct central axis.

9. The harvester according to claim 1 characterized in that the first section of the duct, which has the discharge opening, engages in the second section of the duct.

10. The harvester according to claim 1 characterized in that the duct has an inlet of a width of at least 700 mm.

11. The harvester according to claim 1 characterized in that at least one section of the at least two sections of the duct is able to be displaced obliquely upwards and away from a driver's cab of the harvester.

12. The harvester according to claim 1 characterized in that the discharge opening can be raised to a point above a roof of a driver's cab.

13. The harvester according to claim 1 characterized in that, from a position in which it projects above a top face of the engine and machinery housing, the discharge opening can be lowered at least to a position in which it is substantially flush with the top face.

14. The harvester according to claim 1 characterized in that it is a forage harvester.

15. A harvester comprising:
an engine and machinery housing enabling self propelling of the harvester;
a driver's cab; and
a duct comprising a discharge opening at one end for discharging harvested material and, which is coupled at its other end to the engine and machinery housing to receive the harvested material to be discharged and at least two sections connected end to end longitudinally and which are telescopically displaceable relative to one another in a longitudinal direction thereby allowing the discharge opening to be adjusted in height with respect to the driver's cab;
wherein one section of the at least two longitudinal sections is coupled to the engine and machinery housing and is configured to be divergent in width in a downward direction approaching the end of the duct coupled to the engine and machinery housing.

* * * * *